United States Patent [19]

Crosetti et al.

[11] 4,365,280

[45] Dec. 21, 1982

[54] ESCUTCHEON SIMULATIVE OF A RADIO FOR DISGUISING ELECTRONIC APPARATUS

[75] Inventors: Stephen M. Crosetti; Michael A. Crosetti, both of Oakland, Calif.

[73] Assignee: Bicro, Incorporated, Oakland, Calif.

[21] Appl. No.: 174,863

[22] Filed: Aug. 4, 1980

[51] Int. Cl.³ .......................... G11B 1/00; F41H 3/00
[52] U.S. Cl. .................... 360/137; 248/27.3;
 272/8 R; 312/7.1; 369/10; 428/15; 428/919;
 455/345; 455/347; D14/7; D14/76
[58] Field of Search ........................ D8/350, 351, 353;
 D14/6, 7, 11, 28, 68, 70, 72, 76; D21/112, 113;
 40/538; 109/1 R; 248/27.1, 27.3, 551; 272/8 R,
 8 N; 296/37.8, 37.12; 312/7 R, 204; 360/137;
 361/422; 369/10-12; 428/15, 31, 39, 542, 919;
 455/345-349

[56] References Cited

U.S. PATENT DOCUMENTS

| | | | |
|---|---|---|---|
| 3,582,965 | 6/1971 | De Metrick | 369/11 |
| 3,606,447 | 9/1971 | Ryding | 296/37.12 |
| 3,799,483 | 3/1974 | Chiappinelli | 455/347 X |
| 4,068,175 | 1/1978 | Maniaci | 455/348 X |
| 4,221,380 | 9/1980 | Miller et al. | 428/31 X |

FOREIGN PATENT DOCUMENTS 1226749  3/1971  United Kingdom .................. 369/10

OTHER PUBLICATIONS

Catalog: *The Changing World of AR Automatic Radio*, published by Automatic Radio, 1968, 5 pp.

*Primary Examiner*—Laramie E. Askin
*Attorney, Agent, or Firm*—Ralph L. Mossino; C. Michael Zimmerman

[57] ABSTRACT

Disclosed herein is an escutcheon for concealing a relatively expensive electronic apparatus, particularly magnetic tape players disposed in automobiles and the like. The escutcheon includes a face plate having indicia disposed on a front face thereof suggestive of a relatively inexpensive AM radio. The escutcheon includes means insertable into a receptacle provided for receiving magnetic tape magazines for firmly anchoring the escutcheon onto the magnetic tape player. The escutcheon disguises the appearance of an expensive electronic apparatus as an inexpensive radio to conceal its identity so as to thwart thieves.

13 Claims, 6 Drawing Figures

ESCUTCHEON SIMULATIVE OF A RADIO FOR DISGUISING ELECTRONIC APPARATUS

BACKGROUND OF THE INVENTION

With thievery becoming virtually a cottage industry throughout the world, it has been apparent for some time that devices which tend to reduce the likelihood of one becoming a victim have an enormous consumer acceptance. This is especially the case with respect to automotive goods, where one's automobile is left unattended for extended periods away from one's principal domicile. It is a fairly easy task for a thief to gain access to the interior of a locked, unattended automobile and remove, for example, expensive magnetic tape systems that are currently fashionable.

The following U.S. design Pat. Nos. reflect the state of the art insofar as they appear to be pertinent to the invention of the instant application: D. 147,785 Fanelli et al; D. 186,698 Boldt; D. 185,731 Boldt; D. 213,024 Zeller; D. 235,682 Haas.

These patents are directed to control panels, escutcheons, and the like for various electronic apparatus, such as radios, etc. None of the designs disguises an apparatus so that the apparatus' appearance is deceptive of its intended function; and further, none of the patents discloses an anchoring structure for readily removable fixation onto the main body portion of the electronic apparatus as taught herein.

By way of contrast, the present invention relates to an apparatus in the form of an escutcheon which can easily be retained upon an electronic apparatus such as a cassette tape player, an eight-track cartridge tape system, and the like. The front face plate of the escutcheon is simulative of a rather inexpensive radio. It is generally believed an inexpensive radio is less likely to be stolen. An inexpensive AM radio is the least likely item to be stolen by thieves, since such radios are commonly provided as standard equipment on many automobiles. With respect to the concealment of the presence of expensive tape players, the different equipment function simulated by the escutcheon adds to the disguise relied upon to effect such concealment.

The escutcheon of the present invention can be accommodated for use with various types of cassette and other tape players. Preferred embodiments of the escutcheon described in further detail hereinbelow exemplify various means of fixing the escutcheon to electronic tape apparatus by insertion of an anchor structure within the tape magazine receptacle provided in tape apparatus for receiving cartridges, cassettes, and the like.

SUMMARY AND OBJECTS OF THE INVENTION

Accordingly, it is an object of this invention to provide an escutcheon for fixation to electronic apparatus which, when installed, deceptively alters the appearance of the electronic apparatus to that of a relatively inexpensive common radio, thereby reducing the desirability of theft.

It is a further object of this invention to provide an escutcheon of the character described above which is relatively inexpensive to manufacture, reliable in service, and adaptable for plural types of electronic apparatus.

It is a further object of this invention to provide an escutcheon of the character described above which is relatively inexpensive to obtain, can be easily deployed, and has an external appearance which is complemental to and suggestive of belonging as an integral part of an automobile interior.

These and other objects will become more apparent upon consideration of the ensuing detailed description of preferred embodiments illustrated in the accompanying drawings, which embodiments can easily be disposed within the tape magazine receptacle of a car stereo tape system so that the escutcheon, when so disposed, alters the appearance of the tape system to a common less desirable radio.

DESCRIPTION OF THE PREFERRED EMBODIMENTS

Figure 1:
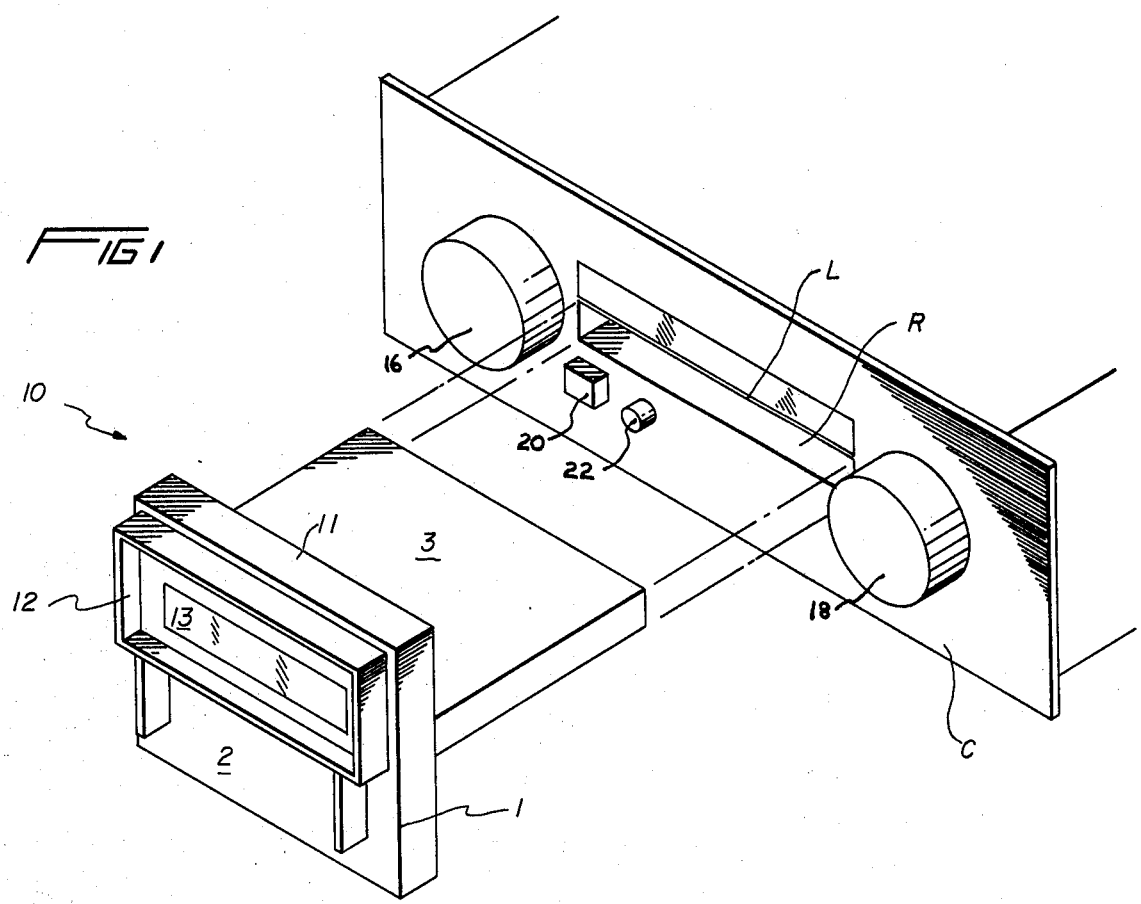
FIG. 1 is a perspective view of the apparatus according to the present invention showing in dotted lines its deployment in a stereo or similar cassette type tape player commonly found in an automobile.

Referring to the drawings, wherein like reference characters refer to like parts throughout the various figures of the drawings, various embodiments of the escutcheon 10 according to the present invention are illustrated. The escutcheon 10 can generally be regarded as including a face plate 1 having a front surface 2 with a simplistic radio design, such as an AM radio. Means extend from a back surface of the face plate for anchoring the escutcheon 10 to the electronic apparatus which is to be disguised. In the illustrated embodiments, the anchoring means is adapted for insertion and retention within a tape magazine receiving receptacle R of a tape player C, and the various forms of such retention will be described in due course.

The face plate 1 is provided with a perimetrical wall 11 extending rearwardly of the face plate to define a narrow dimension of the face plate. In the illustrated preferred embodiments, the perimetrical wall 11 extends in a direction opposite the front surface 2 of the face plate 1 between parallel planes and abuts the facing surface of the tape player C. A second perimetrical wall 12 is mounted to the face plate 2 to extend outward from the front surface 2 and surround a dial indicator face 13 disposed on the front surface, the dial indicator face being provided with AM radio indicia. Disposed below the perimetrical wall 12 are a plurality of simulative pushbuttons 14 suggestive of an AM radio in which station selection can be effected by means of pushbuttons.

The anchoring means extending from the back surface of the face plate 1 for insertion into the tape magazine receiving receptacle R are shown in certain embodiments illustrated in the figures as a solid blank. In the embodiment of FIG. 1, the blank 3 has substantially a rectangular configuration. In the embodiment of FIG.

Figure 2:
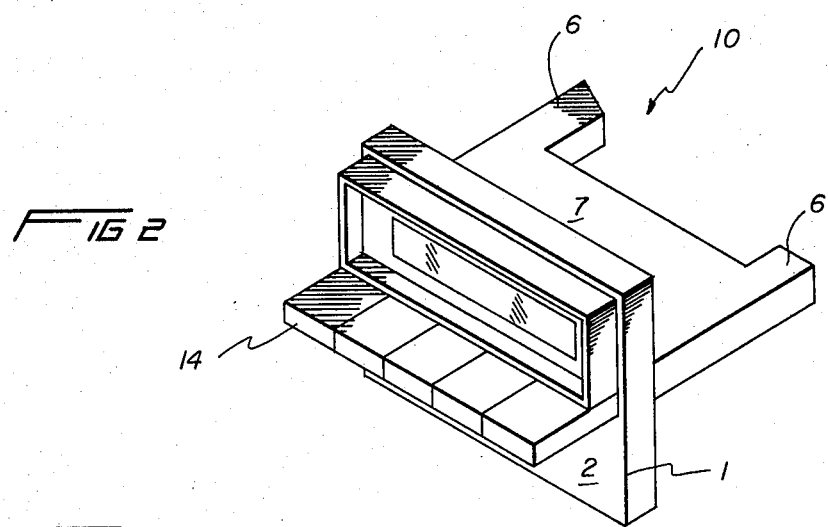
FIG. 2 is a perspective view of a second form of the apparatus according to the present invention.
Figure 4:
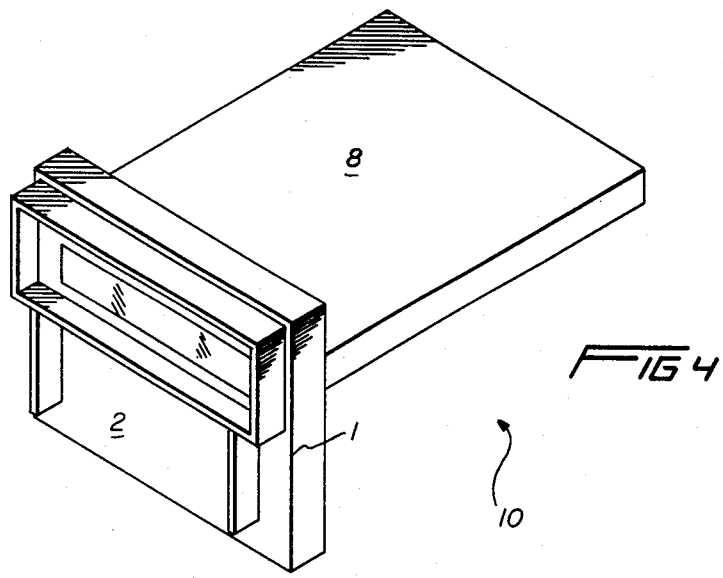
FIG. 4 is a perspective view of a further embodiment of the apparatus according to the present invention.
Figure 6:
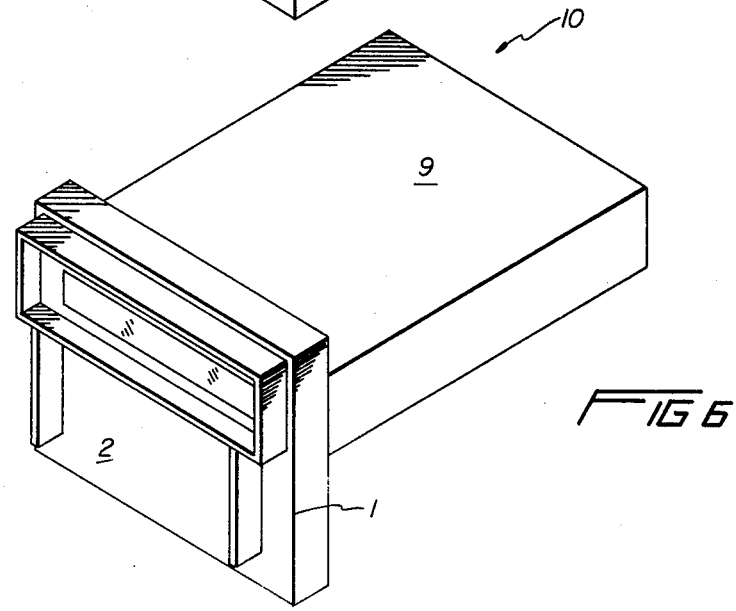
FIG. 6 is an additional perspective view of yet another embodiment of the apparatus according to the present invention.

4, the anchoring means is a blank 8 of similar rectangular configuration, but of different dimensions. The dimensions of the rectangular blank 8 in the embodiment of FIG. 4 are adjusted so the blank 8 is insertable within the tape magazine receiving receptacle R of an end loading cassette tape player. On the other hand, the dimensions of the rectangular blank 3 in the embodiment of FIG. 1 are adjusted so that the blank 3 is insertable within the tape magazine receiving receptacle R of a side loading cassette player. FIG. 6 illustrates an anchoring means embodiment including a blank 9 having a configuration arranged to permit the escutcheon 10 to be used with eight-track cartridge tape systems. The blank 9 has appropriate dimensions to provide a snug fit within the eight-track cartridge receiving receptacle defined by the tape system housing. The embodiment of the escutcheon 10 illustrated in FIG. 2 includes a blank 7 having rearwardly extending protuberances 6, which can be of various geometrical configurations. These protuberances serve as stop members which prevent the blank 7, when inserted into the tape magazine receiving receptacle R, from engaging electronic components, most commonly playback heads, pinchrollers, and the like communicating with the interior defined by the receptacle R.

Figure 5:
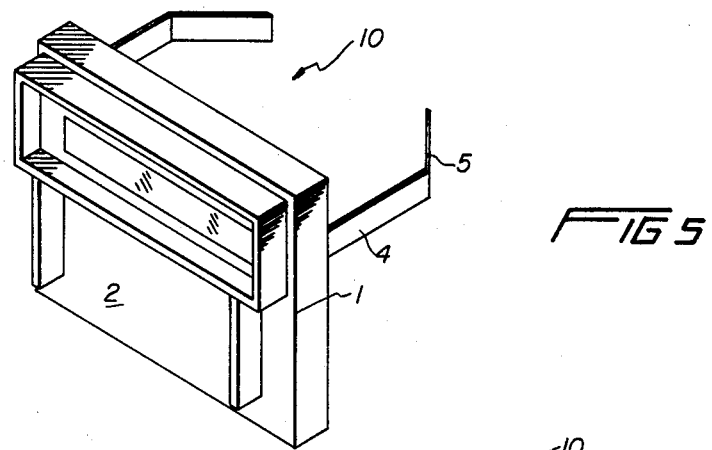
FIG. 5 is a perspective view of a further embodiment of the apparatus according to the present invention.

FIG. 5 depicts a further anchoring means embodiment affixed to the back surface of the face plate 1, which comprises a pair of spring clips having a rearwardly extending linear portion 4, and an inwardly extending portion 5. The spring clips are fashioned in such a manner that they abut and are retained by spring pressure against the peripheral lip L (FIG. 1), which defines the perimeter of the tape magazine receiving receptacle R.

Figure 3:
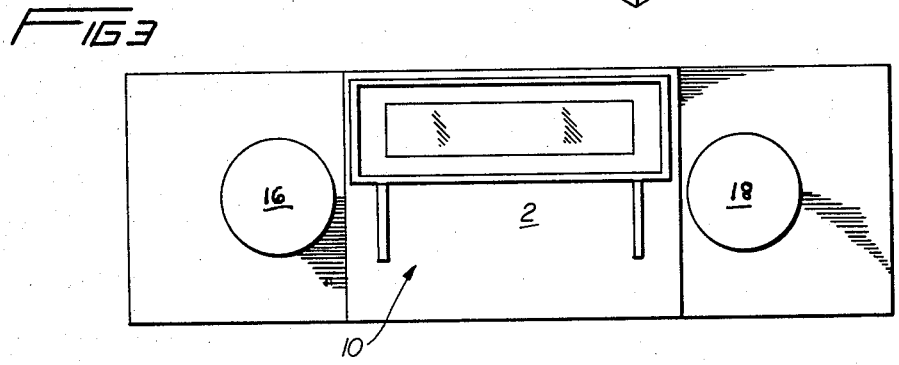
FIG. 3 is a front plan view of the apparatus illustrated in FIG. 1, as installed in the cassette tape player.

As is apparent from the foregoing description and the illustrations of the various embodiments of the present invention in FIGS. 1–6, the escutcheon 10 disguises the appearance of electronic apparatus to conceal its identity from observation by covering features of the electronic apparatus from which its identity can be determined by observation. In this regard, the escutcheon 10 includes a face plate 2 which is configured and dimensioned so as to cover such features against observation. Furthermore, the face plate 2 is provided with indicia 13 (FIG. 1) representing a radio tuning dial indicator that is exposed for observation so as to give the electronic apparatus the disguised appearance of a radio. In the embodiment of the escutcheon 10 shown in FIGS. 1 and 3, the escutcheon is configured and dimensioned to conceal the identity of a magnetic tape player C typically installed in automobiles. The tape player is illustrated as having a pair of spaced cylindrical operator controls 16 and 18 having the appearance of volume and station selection tuning controls characteristic of radios. In addition, the player is shown (FIG. 1) as having a tape magazine receiving receptacle R and additional operator controls 20 and 22 between the pair of cylindrical operator controls. When installed as seen in FIG. 3, the escutcheon 10 conceals the receptacle R and additional operator controls 20 and 22 and associated functional indicia, all of which upon observation, suggest an electronic apparatus other than an inexpensive radio. This concealment together with the simulated radio design of the escutcheon aids in concealing the presence of the tape player C by disguising the tape player function of the electronic apparatus as a radio function. Furthermore, the escutcheon 10 permits the cylindrical operator controls 16 and 18 of the player C to remain exposed so that they cooperate with the escutcheon in creating a disguised appearance of a radio.

In use and operation, it should be clear that when one leaves an automobile unattended, the presence therein of an expensive electronic apparatus can be disguised by anchoring the escutcheon 10 of the present invention to the apparatus. This disguises the expensive electronic apparatus so that it appears upon scrutinization as though a radio of negligible value is contained within the automobile. Further, it should be appreciated that the escutcheon 10 of the present invention is adaptable to a plurality of electronic apparatus commonly referred to as tape players; and that the various embodiments of the escutcheon are merely illustrative of preferred embodiments of the present invention. Therefore, it will be apparent to those skilled in the art that various modifications and changes may be made in the preferred embodiments of the apparatus and the specifically discussed variations without departing from the spirit and scope of the invention as expressed in the following appended claims.

What is claimed is:

1. An escutcheon for disguising the appearance of electronic apparatus to conceal its identity from observation, said electronic apparatus having exposed functional indicia and operator controls from which its identity can be determined by observation, the escutcheon comprising:

a face plate configurated and dimensioned so that, when anchored to the electronic apparatus, it covers against observation of functional indicia and operator controls from which the identity of said electronic apparatus can be determined;

indicia disposed on the face plate so as to be exposed for observation when said face plate is anchored to the electronic apparatus, said indicia representing a radio tuning dial indicator;

and anchor means attached to the face plate for removably anchoring said face plate to the electronic apparatus to cover against observation of functional indicia and operator controls from which the identity of said electronic apparatus can be determined by observation, whereby the appearance of said electronic apparatus is disguised as a radio to conceal its identity from observation.

2. The escutcheon of claim 1 wherein the indicia represents an AM radio tuning dial indicator.

3. The escutcheon of claim 1 wherein the electronic apparatus has operator controls having the appearance of volume and station selection tuning controls characteristic of radios, and the configuration and dimensions of the face plate are selected so that said operator controls having the appearance of volume and station selection tuning controls remain exposed for observation, when said face plate is anchored to said electronic apparatus, to cooperate with the escutcheon to create the disguised appearance.

4. The escutcheon of claim 1 wherein the electronic apparatus to be disguised is of a type capable of functions other than that performed by a radio and includes functional indicia and operator controls associated with such functions from which the identity of said electronic apparatus can be determined, and the anchor means is configured and dimensioned for anchoring the face plate to said type of electronic apparatus.

5. The escutcheon of claim 1 wherein the electronic apparatus is a magnetic tape unit having a housing defining a receptacle for receiving magnetic tape magazines and functional indicia and operator controls associated with the operation of the magnetic tape unit from which the identity of said unit can be determined by observation; and the configuration and dimensions of the face plate are selected so that the receptacle, functional indicia and operator controls associated with the operation of the magnetic tape unit from which the identity of said unit can be determined are covered against observation to give the disguised appearance of a radio to the magnetic tape unit.

6. The escutcheon of claim 5 wherein the magnetic tape unit has a pair of cylindrical operator controls having the appearance of volume and station tuning controls characteristic of radios, and the configuration and dimensions of the face plate are selected so that the pair of cylindrical operator controls remains exposed for observation to cooperate with the escutcheon to create the disguised radio appearance when said face plate is anchored to said magnetic tape unit.

7. The escutcheon of claim 6 wherein the magnetic tape unit has a face exposed for observation with the receptacle for receiving tape magazines opening through the exposed face, the pair of cylindrical operator controls is located relative to the exposed face with said controls spaced apart at each side of the receptacle opening in said exposed face, and the configuration and dimensions of the face plate are selected to cover the entire portion of the face of the magnetic tape unit between the pair of cylindrical operator controls.

8. The escutcheon of claim 5 wherein the anchor means is a structure extending from the face plate in a direction away from the indicia disposed on said face plate, said structure configured and dimensioned so that it is insertable into the receptacle for receiving magnetic tape magazines.

9. The escutcheon of claim 8 wherein the face plate has a narrow dimension extending in the direction of the anchor structure between generally parallel planes, and the anchor structure has a dimension in the direction it extends from the face plate so that the face plate abuts the magnetic tape unit when said anchor structure is inserted into the receptacle for receiving magnetic tape magazines.

10. The escutcheon of claim 8 wherein the anchor structure is a blank dimensioned to be received snuggly within the receptacle for receiving magnetic tape magazines.

11. The escutcheon of claim 10 wherein the blank has protuberances extending therefrom in the direction the anchor structure extends from the face plate, said protuberances disposed on said blank to prevent said blank from engaging electronic components communicating with the interior defined within the receptacle for receiving magnetic tape magazines.

12. The escutcheon of claim 8 wherein the anchor structure includes a pair of spring members disposed and tensioned to bear against structure defining the receptacle for receiving magnetic tape magazines and anchor the face plate to the magnetic tape unit.

13. The escutcheon of either claim 1 or claim 5 further comprising a plurality of simulative station selecting push buttons disposed on the face plate so as to be exposed for observation when said face plate is anchored.

* * * * *